United States Patent [19]

Hitch et al.

[11] Patent Number: 4,817,514
[45] Date of Patent: Apr. 4, 1989

[54] MODULAR ROTISSERIE ROD ASSEMBLY

[75] Inventors: Robert J. Hitch; Mason P. Holland, both of Columbus, Ga.

[73] Assignee: W. C. Bradley Company, Columbus, Ga.

[21] Appl. No.: 455

[22] Filed: Jan. 5, 1987

[51] Int. Cl.$^4$ .............................................. A47J 37/04
[52] U.S. Cl. .................................... 99/419; 99/421 R
[58] Field of Search ................. 99/419, 421 R, 421 H, 99/421 HH, 449, 450, 420, 421 A, 421 HV, 421 M, 421 P, 421 JP, 421 V; 403/307, 320, 343, 46; 411/383, 384, 397

[56] References Cited

U.S. PATENT DOCUMENTS

| 1,059,560 | 4/1913 | Parker | 403/307 |
| 1,716,593 | 6/1929 | Martin | 403/307 |
| 2,318,590 | 5/1943 | Boynton | 403/320 |
| 2,821,905 | 2/1958 | Culligan | 99/421 |
| 3,447,445 | 6/1969 | Koziol | 99/421 R |

FOREIGN PATENT DOCUMENTS

| 2522566 | 12/1976 | Fed. Rep. of Germany | 99/421 R |
| 2083343 | 3/1982 | United Kingdom | 99/421 HH |

Primary Examiner—Henry J. Recla
Assistant Examiner—Linda J. Sholl
Attorney, Agent, or Firm—Hurt, Richardson, Garner, Todd, and Cadenhead

[57] ABSTRACT

A Modular Rotisserie Rod Assembly is disclosed having a pair of rod members with threaded end portions that can be joined with a collar and also separated for facilitating storage, transport, and/or cleaning. The rod members and the connectors are multi-faceted for engaging and turning food or accessory items such as food-holding baskets mounted thereon.

8 Claims, 1 Drawing Sheet

MODULAR ROTISSERIE ROD ASSEMBLY

BACKGROUND OF THE INVENTION

Rotisserie units are often used to cook food, the units having a rod which receives the food and is suspended over a barbecue grill or pit or with a similar arrangement. The rotisserie rod is rotatable either with a motor or a hand crank and the food is normally cooked by causing the rod to slowly rotate the food over the coals or other cooking mediums. A typical arrangement may have the rotisserie rod suspended over a bed of coals, with one end secured to the motor shaft and turnable therewith, and the other end supported for rotation by a bracket or the like.

In general, the rotisserie rod is greater in length than the firebox or pit, with the ends supported from the edges of the firebox or by stands at the edges of the pit, and the food disposed generally centrally on the suspended rod. As such, the rods are normally quite long, precluding easy storage or cleaning in a dishwasher, and even making hand washing of the rod after use a difficult project.

SUMMARY OF THE INVENTION

It is, therefore, one of the principal objects of the present invention to provide a Modular Rotisserie Rod Assembly that is easily supported over a firebox or barbecue pit for cooking food thereon, and which is impervious to the intense heat generated by the burner or coals.

Another object of the present invention is to provide a Modular Rotisserie Rod Assembly that can be easily disassembled into several shorter members and which is easily reassembled to its operative length.

A further object of the present invention is to provide a modular rotisserie rod that, by its disassembly into shorter members, is easily stored and shipped, and which can be easily cleaned, the shorter length permitting easier hand washing or cleaning in a dishwasher.

A still further object of the present invention is to provide a Modular Rotisserie Rod Assembly that is durable for providing a long service life.

These and additional objects are attained by the present invention which relates to a Modular Rotisserie Rod Assembly having at least two rod members which can be joined end to end with a coupling means. An adjustment means is also provided for making changes in the position of the coupling means to permit easy installation and/or removal of certain objects, such as cooking baskets, for example, which have defined openings for receiving a rotisserie rod.

Various other objects and advantages will become apparent from the following description, with reference to the accompanying drawings.

DETAILED DESCRIPTION OF THE PREFERRED EMBODIMENT

Figure 1:
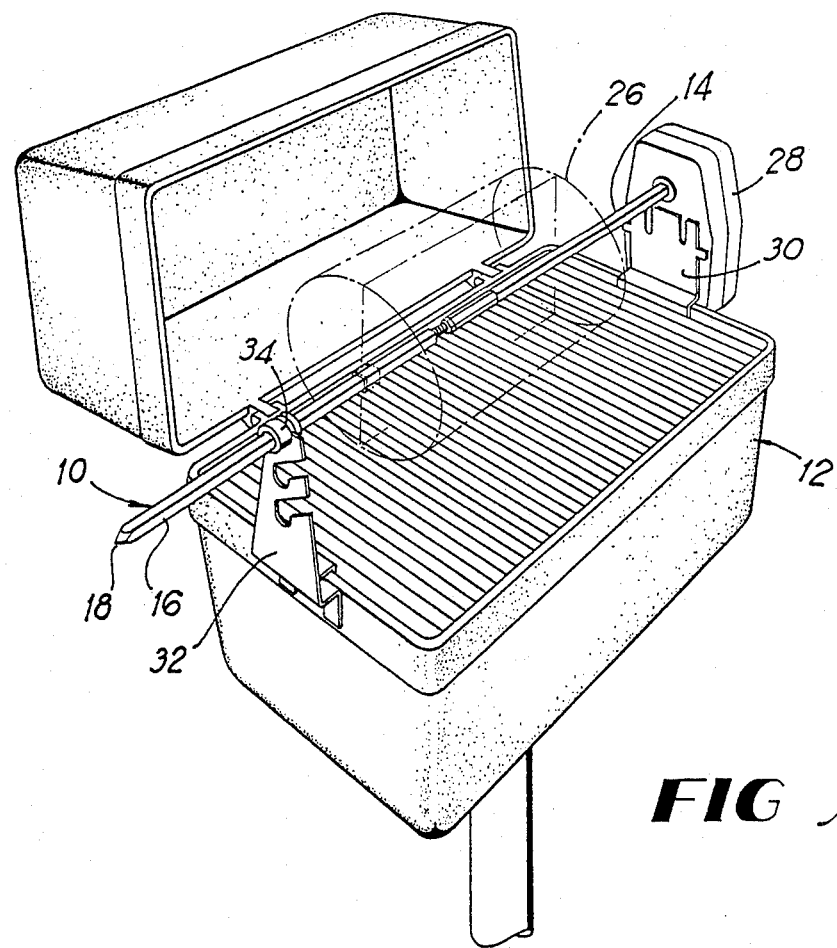
FIG. 1 is a perspective view of the present Modular Rotisserie Rod Assembly, shown here in installed position with a food tumbling basket mounted thereon.

Referring now more specifically to the drawings, and to FIG. 1 in particular, numeral 10 designates generally the Modular Rotisserie Rod Assembly, the rod assembly being shown in installed position over a barbecue grill 12. The rod may be constructed from any suitable material that is impervious to heat and that is preferably easy to clean, one example being chrome-plated steel. These qualities are important since the rods in use are disposed over a bed of hot coals or a gas or electric burner and thus encounter substantial heat levels. The rods must also be easily and thoroughly cleanable due to their contact with foods being grilled.

The rod assembly includes right and left identical rod members 14 and 16, respectively, each being generally square in cross section, although a rectangular shape may also be employed. The square or rectangular shape offers resistance to the turning of food skewered directly onto the rods, as for example, where an entire chicken is disposed on the rod. The outer tips 18 of the rod members are pointed, thereby facilitating their penetration of food to be mounted thereon.

Figure 2:
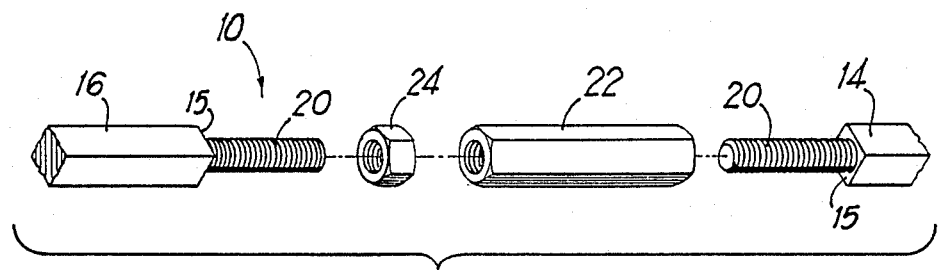
FIG. 2 is a partial, exploded view of the rotisserie rod assembly, illustrating its component parts.

The opposite or inner ends 20 of the rods are threaded for receiving a connecting means such as collar 22 by which the rod members are secured together. Threadedly mounted adjacent collar 22 is an adjustment means such as jam nut 24. The collar 22 and the nut 24 are hexagonal, the hexagonal stock being easily tightened with a wrench, pliers, etc. In addition, the connection can be made using stock pieces having a relatively small diameter, and the stock is readily available. Similarly, other multi-faceted connectors may be used for the connector and nut, the disclosure not being meant to limit the number of facets. As shown in FIGS. 1 and 2, the periphery of the rod members 14 and 16, the collar 22, and the nut 24 are approximately equal and the threaded portions 20 are correspondingly reduced so as to be received within the collar and nut. The assembly is thus able to easily pass through defined apertures in food tumbling baskets and the like, as discussed hereinbelow.

In addition, as can be seen in FIG. 1, when assembled, the shoulder portion 15 of the rod members 14 and 16 which is adjacent the threaded portion, abuts either the collar or the nut, thereby keeping the connection secured during operation of the rotisserie, in conjunction with the tightening provided through the cooperation of the collar and nut. Shoulder portion 15 thus serves as a stop means against further rotation of the rod members once they have been connected for use in the rotisserie.

The rod assembly may also be used for mounting accessories, an example being the food tumbling basket 26, shown in broken lines in FIG. 1. Such accessories normally have mounting means (not shown) which conform to the facets of the rod in order for the accessories to rotate therewith as the rod turns. Thus, in order to slide the basket or similar structures over the connector, the jam nut is used to align the facets of the rod with those of the connector, while at the same time tightening the assembly. Normally, at least two opposed facets of the hexagonal connector and nut must be aligned with two of the sides of the mounting means of the accessory and the rod members, the slack in the other directions being taken up by a set screw or similar means.

For operation, the rod has one end secured in the rotisserie motor 28, the motor being mounted on the side of the grill box with bracket 30. The opposite end of the rod is held by adjustment bracket 32, this bracket having three slots by which the relative vertical height of the rod may be adjusted. A circular collar 34 is disposed around the rod where it contacts the bracket 32 for facilitating rotation in the semi-circular slots of the adjustment bracket.

The present modular rotisserie rod affords a number of advantages over prior art, one piece rods. The one piece rods are difficult to clean due to their length, while the present assembly can be broken down and cleaned in an automatic dishwasher. Storage and transport of the present modular assembly are also much easier than with the relatively long one-piece rod. The modular assembly is also safer to handle than a long, one-piece rod in that it is much easier to control when moving the rod assembly from one place to another in its disassembled state.

While an embodiment of a Modular Rotisserie Rod Assembly has been shown and described in detail herein, various changes and modifications may be made without departing from the scope of the present invention.

I claim:

1. A modular rotisserie rod assembly for suspending food over a bed of coals in a barbecue grill or the like comprising right and left rod members each having a threaded end, said threaded end being of a reduced dimension relative to said rod members and including a shoulder portion adjacent said threaded ends, a collar means having a passageway therethrough, said passageway being threaded for threadedly receiving said threaded ends and connecting said rod members, an adjustment means having a threaded passageway therethrough and disposed adjacent said collar means on one of said threaded ends for locking said collar means in a selected position with said collar means abutting one of said shoulder portions for preventing unthreading of said assembly during operation of the rotisserie.

2. A modular rotisserie rod assembly as defined in claim 1 in which said rod members each have generally pointed ends opposite said threaded ends for facilitating the passage of said rod members through food articles to be mounted thereon.

3. A modular rotisserie rod assembly as defined in claim 1 in which said rod members have a plurality of facets for arresting free rotation of food articles mounted thereon and turning the food articles with said rod members and rotation thereof occurs.

4. A modular rotisserie rod assembly as defined in claim 3 in which said collar means and said adjustment means each have a plurality of facets, at least two of which are aligned with two of said facets of said rod members when said assembly is secured together.

5. A modular rotisserie rod assembly as defined in claim 4 in which said collar means and said adjustment means have hexagonal outer surfaces.

6. A modular rotisserie rod assembly for suspending food or food-containers over a barbecue grill or the like, said assembly comprising a pair of rod members each having a relatively pointed end and opposed threaded ends, said threaded ends being of a reduced dimension relative to said rod members with said rod members including shoulder portions adjacent said threaded ends, a collar means having a threaded passageway therethrough for receiving said threaded ends and securing said rod members together, with one end of said collar means abutting one of said shoulder portions for preventing unthreading of the connection during operation of the rotisserie, and an adjustment means disposed adjacent said collar means and having a threaded passageway therethrough for receiving one of said threaded ends and locking said adjustment means and collar means together in a selected position.

7. A modular rotisserie rod assembly as defined in claim 6 in which said rod members, said collar means and said adjustment means have faceted outer surfaces for engaging and turning food or food-holding accessories.

8. A modular rotisserie rod assembly for suspending food or food containers over a barbecue grill or the like, said food containers having defined apertures formed therein for receiving said rod assembly, said assembly comprising right and left rod members each including a relatively pointed end and a threaded end, said threaded ends being of a reduced dimension relative to said rod members and including a shoulder portion adjacent said threaded ends, collar means having a threaded passageway therethrough for receiving said threaded ends and securing said rod members together with one end of said collar means abutting one of said shoulder portions for preventing unthreading of the connection during operation of the rotisserie, and an adjustment means disposed adjacent said collar means and having a threaded passageway therethrough for receiving one of said threaded ends for locking said collar means in a selected position, said rod means, said collar means, and said adjustment means all having an outer circumference of substantially equal diameter and less than said defined apertures in said food containers for passing therethrough.

* * * * *